(12) United States Patent
Sakuma et al.

(10) Patent No.: US 7,027,357 B2
(45) Date of Patent: Apr. 11, 2006

(54) ACOUSTIC COMMUNICATION DEVICE AND ACOUSTIC SIGNAL COMMUNICATION METHOD

(75) Inventors: Hirohisa Sakuma, Minato-ku (JP); Jun Fujiwara, Minato-ku (JP)

(73) Assignee: Tokyo Gas Co., Ltd., Tokyo (JP)

(*) Notice: Subject to any disclaimer, the term of this patent is extended or adjusted under 35 U.S.C. 154(b) by 464 days.

(21) Appl. No.: 10/310,823

(22) Filed: Dec. 6, 2002

(65) Prior Publication Data
US 2003/0117896 A1 Jun. 26, 2003

(30) Foreign Application Priority Data
Dec. 13, 2001 (JP) .................. 2001-380206

(51) Int. Cl.
*H04B 11/00* (2006.01)

(52) U.S. Cl. ............... 367/134; 367/904; 340/870.18; 340/870.19; 340/870.25; 340/870.26; 73/866.5; 73/861.23; 137/624.11

(58) Field of Classification Search ......... 340/870.18, 340/870.19, 870.25, 870.26; 367/134, 904; 73/866.5, 861.23; 137/624.11
See application file for complete search history.

(56) References Cited

U.S. PATENT DOCUMENTS

| | | | |
|---|---|---|---|
| 4,348,906 A * | 9/1982 | Feller | 73/861.77 |
| 4,856,321 A * | 8/1989 | Smalling et al. | 73/40.5 A |
| 4,888,706 A * | 12/1989 | Rush et al. | 700/283 |
| 5,029,147 A * | 7/1991 | Andrews et al. | 367/134 |
| 5,502,652 A * | 3/1996 | Hoggatt et al. | 702/136 |
| 5,636,653 A * | 6/1997 | Titus | 137/14 |
| 6,130,859 A | 10/2000 | Sonnenschein et al. | |
| 6,392,960 B1 * | 5/2002 | Seltzer et al. | 367/134 |
| 6,778,100 B1 * | 8/2004 | Schempf | 340/870.07 |

FOREIGN PATENT DOCUMENTS

| | | |
|---|---|---|
| EP | 0 613 267 A2 | 8/1994 |
| GB | 2 162 668 A | 2/1986 |
| JP | 58-153433 | 9/1983 |
| JP | 62-210324 | 9/1987 |
| JP | 5-252578 | 9/1993 |
| JP | 8-200868 | 7/1997 |

OTHER PUBLICATIONS

Yinghui Li et al., "Experimental Study on Ultrasonic Signal Transmission Within the Water-Filled Pipes", Proc. of Fourth Annual Conference on Mechatronics and Machine Vision in Practice, Sep. 23-25, 1997, pp. 93-98.

* cited by examiner

*Primary Examiner*—Timothy Edwards, Jr.
(74) *Attorney, Agent, or Firm*—Staas & Halsey LLP

(57) ABSTRACT

The present invention provides an acoustic transmitter for sequentially transmitting a plurality of pulse signals by sound. Each of the plurality of pulse signals is a signal of at least one modulated carrier wave, which has a predetermined frequency. The carrier wave of each of the pulse signals has a mutually different frequency. The transmitter performs amplitude modulation and/or phase modulation based on transmission information, and modulation by a signal indicating a window function, for the carrier wave of each of pulse signals. Then the transmitter sequentially transmits the plurality of pulse signals by sound.

12 Claims, 10 Drawing Sheets

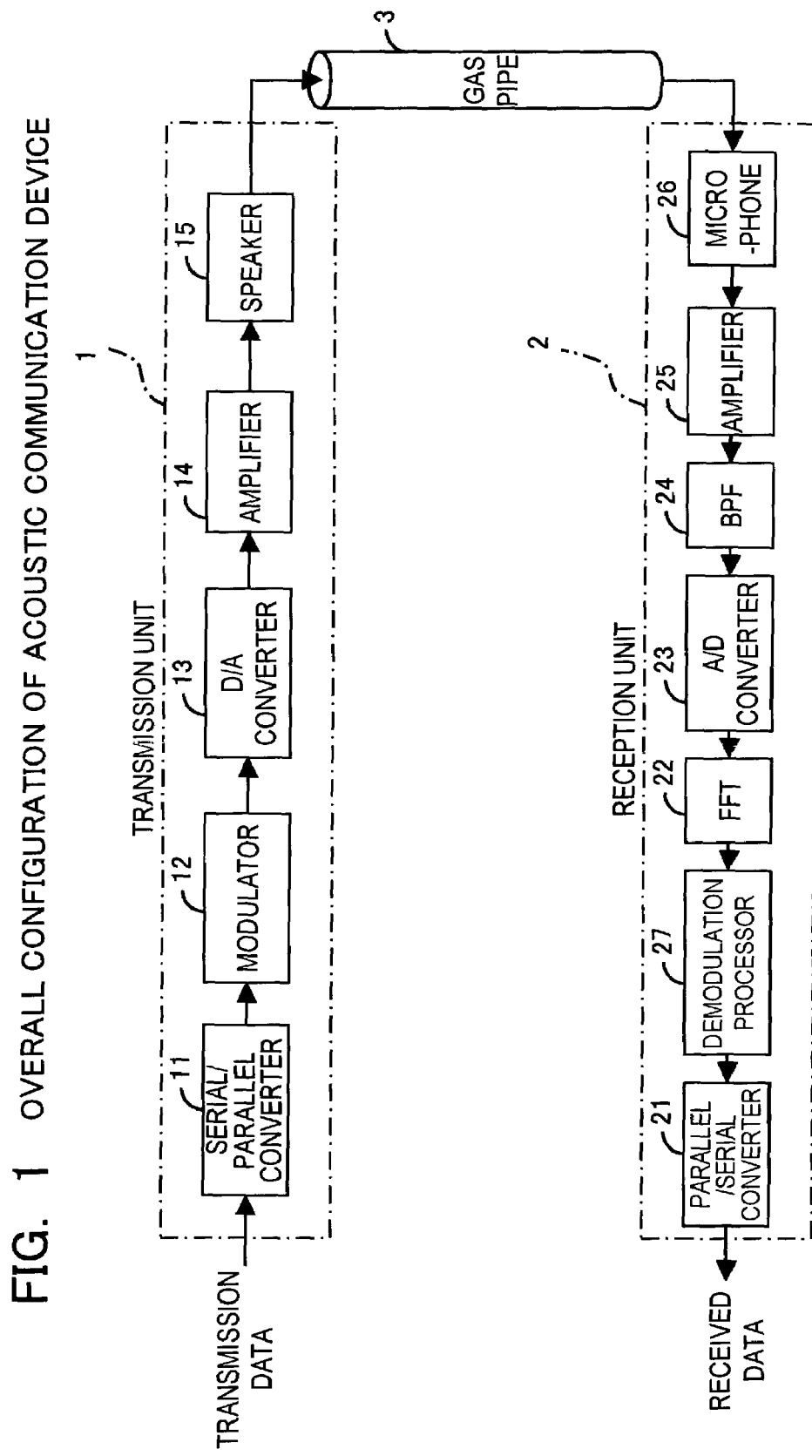

CONFIGURATION OF PARALLEL /SERIAL CONVERTER AND MODULATOR

CONFIGURATION OF PSK MODULATOR

TIME WAVEFORM OF GAUSSIAN PULSE

POWER SPECTRUM OF GAUSSIAN PULSE

FIG. 5A
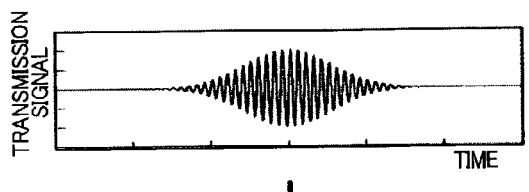
FIG. 5B
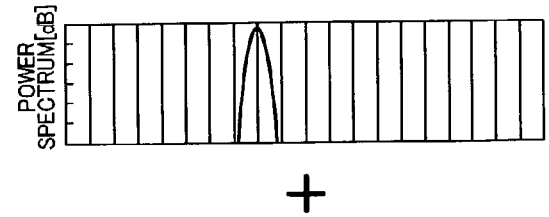
+
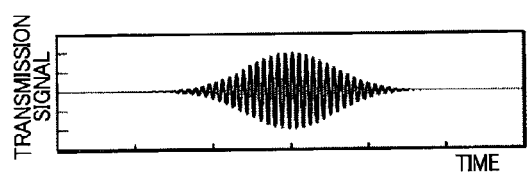
+
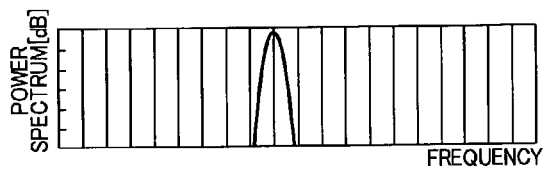
+
⋮
+
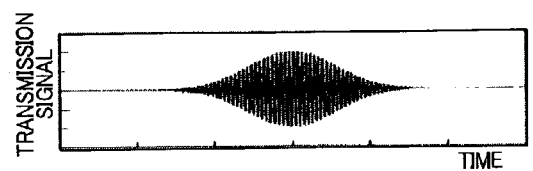
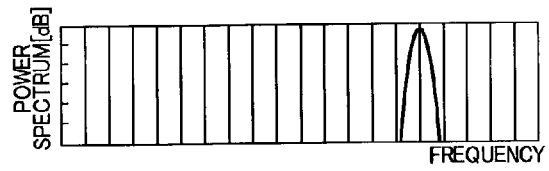
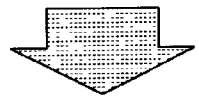
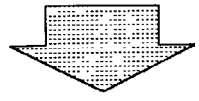
FIG. 5C
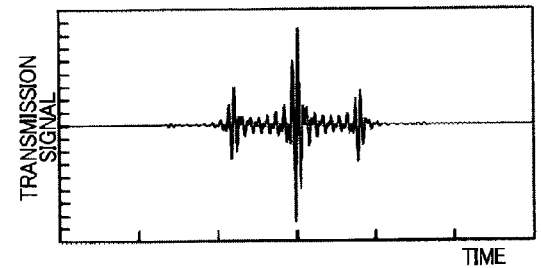
FIG. 5D
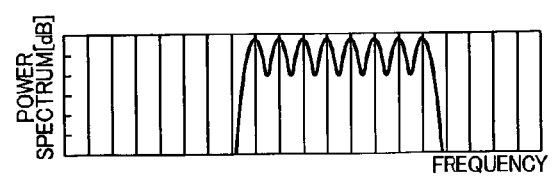

FIG. 8A
CONFIGURATION OF SERIAL/PARALLEL CONVERTER AND MODULATOR
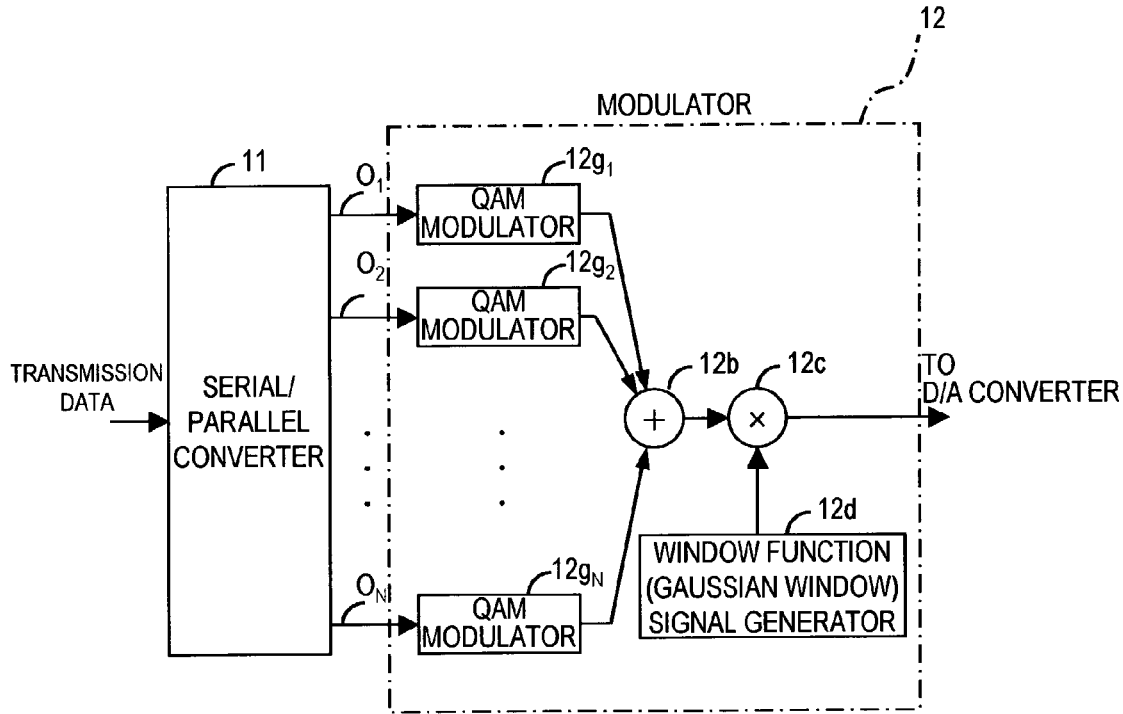
FIG. 8B  CONFIGURATION OF QAM MODULATOR
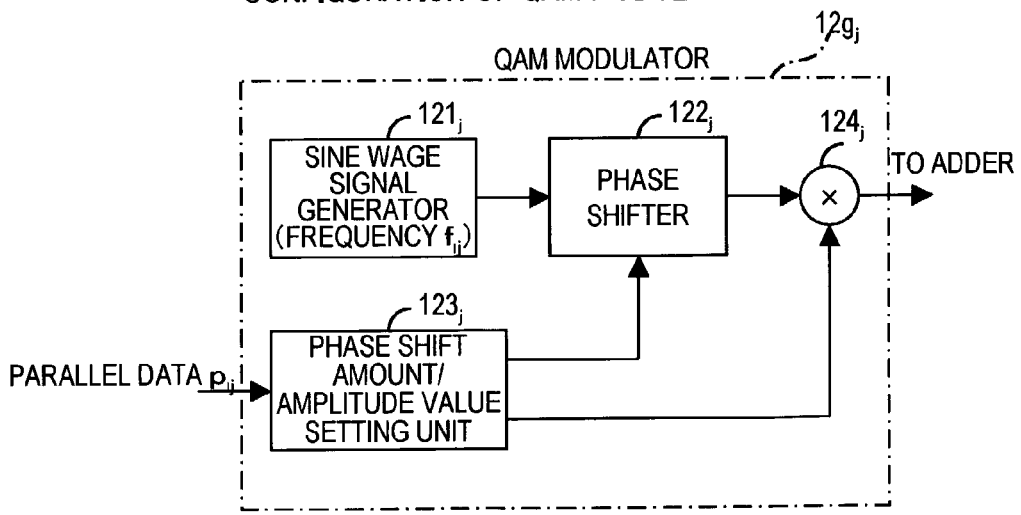

ANOTHER CONFIGURATION OF QAM MODULATOR

ACOUSTIC COMMUNICATION DEVICE AND ACOUSTIC SIGNAL COMMUNICATION METHOD

BACKGROUND OF THE INVENTION

1. Field of the Invention

The present invention relates to an acoustic transmitter and an acoustic signal transmission method for transmitting transmission information as acoustic signals. The present invention also relates to an acoustic receiver and an acoustic signal reception method for receiving communication information as acoustic signals. The present invention also relates to an acoustic communication device comprising such an acoustic transmitter and acoustic receiver, and an acoustic signal communication method.

The present invention also relates to a program product for a computer installed in an acoustic transmitter.

2. Description of the Related Art

A remote monitoring/control system which transmits an amount of gas consumption of each home (residence) to a center station for automatic meter reading and collection, notifies of a gas leak when it occurs, or shuts off the gas meter by remote control from the center station responding to gas leak notification, has been in practical use.

For such a remote monitoring/control system, a microcomputer having communication functions or the like is disposed in a gas meter installed at each home (residence). The microcomputer or the like of the gas meter is connected to a terminal network control device via a wire line, and the terminal network control device is connected to the center station via a telephone line.

For this, a through hole is constructed in each residence to pass through the wire line connecting the gas meter and the terminal network control device. This construction, however, is often difficult especially for multiple dwelling homes, and in some cases damages the visual appearance of the building.

An alternative idea is connecting the microcomputer or the like of the gas meter to the terminal network control device via wireless communication, such as a radio wave, and connecting the terminal network control device to a telephone (stationary telephone) of each home, so as to be connected to the center station via the telephone line. Recently, however, customers who have no telephones at home are increasing because of the spread of portable telephones and PHS, so such a method of using a radio wave can not be applied to all residences.

A decrease in the cost of such communication equipment is also demanded.

For this, an acoustic signal communication method for propagating the communication information inside a gas pipe or the like as acoustic signals, is under consideration. In this method, such communication information as meter values, gas leak occurrence notification and the like is transmitted from a gas meter installed at one end of a gas pipe to a terminal network control device installed at the other end of the gas pipe by acoustic signals.

When communication is performed by acoustic signals inside a gas pipe, however, reverberation waves (delay waves) are generated due to the reflection of sound at the bending section and branching sections of the pipe, for example. Therefore if communication information is continuously transmitted, acoustic signals transmitted later are interfered with by the reverberation of the previously transmitted acoustic signals, and the reception side can not accurately receive acoustic signals.

To prevent this influence of reverberation, it is necessary to wait until the reverberation of previously transmitted acoustic signals is attenuated to a predetermined level or less before transmitting the next acoustic signals. Therefore an acoustic communication based on simple pulse signals has limitations in improving transmission speed.

On the other hand, it has also been attempted to modulate pulse signals by Gaussian window signals before transmission so as to be less influenced by reverberation waves, where a certain improvement of transmission speed has been confirmed, but there is a demand to further improve the transmission speed.

SUMMARY OF THE INVENTION

It is an object of the present invention to improve the transmission speed of acoustic communication.

It is another object of the present invention to provide an acoustic communication device and an acoustic signal communication method, which are resistant to reverberation.

An acoustic transmitter according to a first aspect of the present invention is an acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said acoustic transmitter comprising: a modulation unit, which performs amplitude modulation and/or phase modulation based on transmission information, and modulation by a signal indicating a window function, for the carrier wave of each of said plurality of pulse signals; and an acoustic transmission unit, which sequentially transmits said plurality of pulse signals modulated by said modulation unit by sound.

An acoustic signal transmission method according to a first aspect of the present invention is an acoustic signal transmission method for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said method comprising: performing amplitude modulation and/or phase modulation based on transmission information, and modulation by a signal indicating a window function, for the carrier wave of each of said plurality of pulse signals; and sequentially transmitting said modulated plurality of pulse signals by sound.

A program product according to a first aspect of the present invention is a program product for a computer installed in an acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said program product comprising: performing amplitude modulation and/or phase modulation based on digital data indicating transmission information for digital data representing the carrier wave of each of said plurality of pulse signals; and performing modulation by a signal indicating a window function for said digital data representing the carrier wave.

And a program product according to a first aspect of the present invention is a program product for a computer installed in an acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said program product comprising: when the carrier wave is modulated using phase shift keying based on transmission information, converting said transmission information into a phase shift amount of said carrier wave, when the carrier wave is modulated using amplitude shift keying based on said transmission information, converting said transmission information into an amplitude value of said carrier wave, or when the carrier wave is modulated using QAM based on said transmission information, converting said transmission information into an amplitude value and phase shift amount of said carrier wave; and substituting said amount and/or value converted from said transmission information for one or more parameters of a formula that multiplies a formula expressing said at least one carrier wave by a formula expressing a window function, said one or more parameters being the phase shift amount of the carrier wave in the case of the phase shift keying, the amplitude value of the carrier wave in the case of the amplitude shift keying, or the amplitude value and the phase shift amount of the carrier wave in the case of QAM.

According to the first aspect of the present invention, the amplitude modulation and/or phase modulation are performed for the carrier wave of each of a plurality of pulse signals, so as to represent transmission information having multi-values (e.g. a plurality of bits), therefore a plurality of pieces of information can be transmitted by one modulation symbol in one carrier wave. As a result, transmission speed can be improved.

Since information is modulated by the signal representing the window function, interference between carrier waves can be decreased even if a plurality of carrier waves are overlapped, so this also can improve transmission speed.

The carrier wave of each of a plurality of pulse signals has a mutually different frequency, so even if the next pulse signal is transmitted in a state where the reverberation of the previously transmitted pulse signal has not been sufficiently attenuated, the reception side can easily demodulate the next pulse signal without error. Therefore the transmission interval of pulse signals can be decreased compared with prior art, and as a result, transmission speed can be dramatically improved.

In the first aspect of the present invention, it is preferable that when at least one of a plurality of pulse signals has a plurality of carrier waves which are modulated, the plurality of carrier waves have mutually different frequencies, and the modulation unit performs modulation based on the individual pieces of transmission information for each one of the plurality of carrier waves. Therefore transmission information based on one modulation symbol can be further increased. In other words, if modulation is performed for all the carrier waves by a same modulation means, the transmission speed becomes the transmission speed multiplied by the number of carrier waves, in comparison with the case when only one carrier wave is used.

An acoustic receiver according to a second aspect of the present invention is an acoustic receiver for receiving a plurality of pulse signals by sound, each of said plurality of pulse signals being a signal of at least one modulated carrier wave, which has a predetermined frequency, the carrier wave of each of said plurality of pulse signals having a mutually different frequency, said acoustic receiver comprising: an acoustic reception unit, which sequentially receives, as sound, said plurality of pulse signals after amplitude modulation and/or phase modulation based on transmission information, and modulation by a signal indicating a window function are performed for the carrier wave of each of said plurality of pulse signals, and converts the pulse signals into electric signals; and a demodulation unit, which performs Fourier transform for each of said plurality of pulse signals converted by said acoustic reception unit, reads a phase value and/or amplitude value at the frequency of the carrier wave of each pulse signal, and demodulates communication information based on the read value.

An acoustic reception method according to a second aspect of the present invention is an acoustic reception method for receiving a plurality of pulse signals by sound, each of said plurality of pulse signals being a signal of at least one modulated carrier wave, which has a predetermined frequency, the carrier wave of each of said plurality of pulse signals having a mutually different frequency, said method comprising: sequentially receiving, as sound, said plurality of pulse signals after amplitude modulation and/or phase modulation based on transmission information, and modulation by a signal indicating a window function are performed for the carrier wave of each of said plurality of pulse signals, and converting the received pulse signals into electric signals; and performing Fourier transform for each of said converted plurality of pulse signals, reading a phase value and/or amplitude value at the frequency of said carrier wave of each pulse signal, and demodulating communication information based on the read value.

According to the second aspect of the present invention, the acoustic receiver can be simplified.

An acoustic communication device according to a third aspect of the present invention is an acoustic communication device, which has an acoustic transmitter for sequentially transmitting a plurality of pulse signals by sound and an acoustic receiver for sequentially receiving said plurality of pulse signals by sound, each of said plurality of pulse signals being a signal of at least one modulated carrier waves, which has a predetermined frequency, the carrier wave of each of said plurality of pulse signals having a mutually different frequency, wherein said acoustic transmitter comprises: a modulation unit, which performs amplitude modulation and/or phase modulation based on transmission information, and modulation by a signal indicating a window function for the carrier wave of each of said plurality of pulse signals; and an acoustic transmission unit, which sequentially transmits the plurality of pulse signals modulated by said modulation unit by sound; and said acoustic receiver comprises: an acoustic reception unit, which sequentially receives the plurality of pulse signals transmitted by said acoustic transmission unit, and converts the pulse signals into electric signals; and a demodulation unit, which performs Fourier transform for each of said plurality of pulse signals converted by said acoustic reception unit, reads a phase value and/or amplitude value at the frequency of the carrier wave of each pulse signal, and demodulates communication information based on the read value.

An acoustic signal communication method according to a third aspect of the present invention is an acoustic signal communication method performed by an acoustic communication device, which has an acoustic transmitter for sequentially transmitting a plurality of pulse signals by sound and an acoustic receiver for sequentially receiving said plurality of pulse signals by sound, each of said plurality of pulse signals being a signal of at least one modulated carrier waves, which has a predetermined frequency, the carrier wave of each of said plurality of pulse signals having a mutually different frequency, said method comprising: performing amplitude modulation and/or phase modulation based on transmission information, and modulation by a signal indicating a window function for the carrier wave of each of said plurality of pulse signals, in said acoustic transmitter; sequentially transmitting said plurality of pulse signals by sound, in said acoustic transmitter; and sequentially receiving said plurality of pulse signals transmitted by said acoustic transmitter, and converting the received pulse signals into electric signals, in said acoustic receiver; and performing Fourier transform for each of said plurality of converted pulse signals, reading a phase value and/or amplitude value at the frequency of the carrier wave of each pulse signal, and demodulating communication information based on the read value, in said acoustic receiver.

According to the third aspect of the present invention as well, the same effect of the above described first aspect and second aspect of the present invention can be obtained.

BRIEF DESCRIPTION OF THE DRAWINGS

FIG. 1 is a block diagram depicting the general configuration of an acoustic communication device according to the present embodiment;

FIG. 5A shows an example of the time waveform of 8 signals $v_{i1}(t) \cdot g(t)$ to $v_{i8}(t) \cdot g(t)$ when N=8;

FIG. 5B shows the power spectrum of the signals $v_{i1}(t) \cdot g(t)$ to $v_{i8}(t) \cdot g(t)$;

FIG. 5C shows the time waveform of 8 signals $v_{i1}(t) \cdot g(t)$ to $v_{i8}(t) \cdot g(t)$ added;

FIG. 5D shows the power spectrum of the 8 signals added;

FIG. 8A is a block diagram depicting a detailed configuration of the serial/parallel converter and modulator in the case of when QAM is executed;

FIG. 8B is a block diagram depicting a detailed configuration of the QAM modulator included in the modulator;

DESCRIPTION OF THE PREFERRED EMBODIMENTS

Figure 2A:
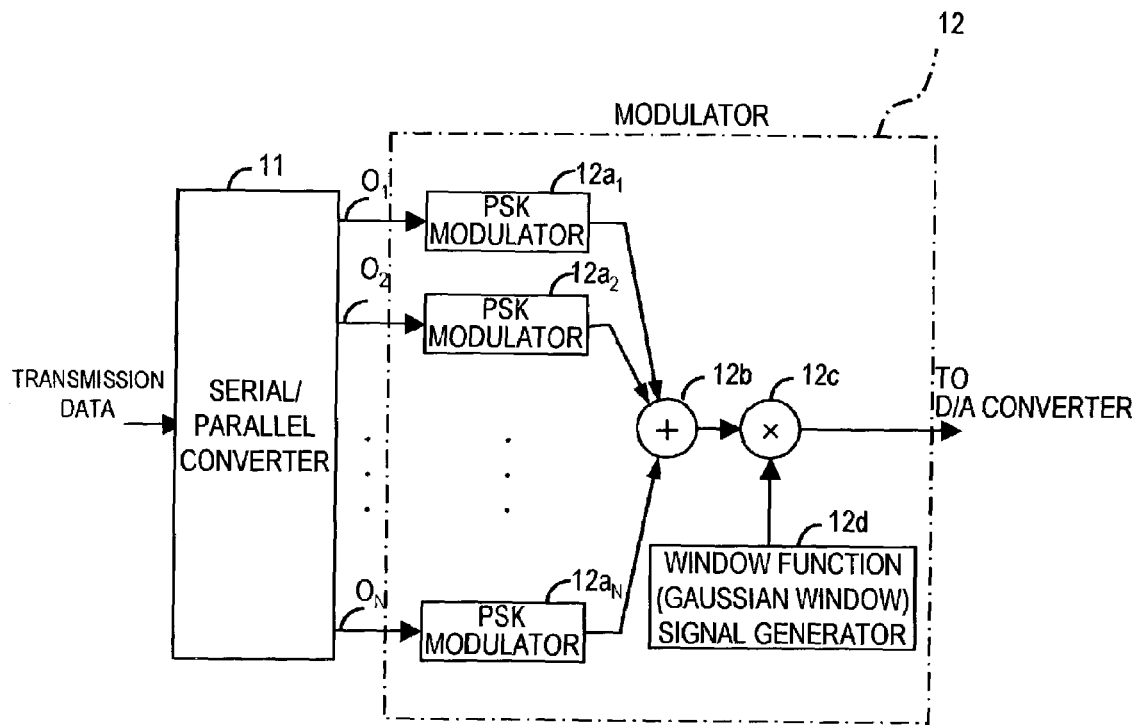
FIG. 2A is a block diagram depicting a detailed configuration of the serial/parallel converter and the modulator when PSK is performed.

An embodiment when an acoustic communication device according to the present invention is applied to a system that performs automatic reading of a gas meter, a gas leak alarm and the like will now be described, but this embodiment is just an example, and shall not limit the technical scope of the present invention.

FIG. 1 is a block diagram depicting an overall configuration of an acoustic communication device according to the present embodiment. This acoustic communication device has a transmission unit 1 and a reception unit 2. A space in the gas pipe 3 is used as a communication line between the transmission unit 1 and the reception unit 2.

The transmission unit 1 has a serial/parallel converter 11, modulator 12, digital/analog converter (hereafter D/A converter) 13, amplifier 14, and speaker 15. The reception unit 2 has a parallel/serial converter 21, demodulation processor 27, fast Fourier transformer (hereafter FFT) 22, analog/digital converter (hereafter A/D converter) 23, band-pass filter (BPF) 24, amplifier 25, and microphone 26.

In the transmission unit 1, transmission/reception and processing are performed by electric signals for the blocks from the transmission data, which is input to the serial/parallel converter 11, to the input data of the speaker 15 via the serial/parallel converter 11, modulator 12, D/A converter 13, and amplifier 14. For the blocks from the output data of the speaker 15 to the input data of the microphone 26 via the gas pipe 3, transmission/reception is performed by acoustic signals (acoustic pulse signals). In the reception unit 2, transmission/reception and processing are performed by electric signals for the blocks from the output data of the microphone 26 to the reception data, which is output from the parallel/serial converter 21 via the amplifier 25, A/D converter 23, FFT 22, demodulation processor 27, and parallel/serial converter 21.

In this acoustic communication device, digital M bits of transmission data d, which indicates the gas meter reading value (amount of gas consumption), gas leak alarm and the like, are input to the transmission unit 1 as serial (bit serial) data. This transmission data d is converted into acoustic signals (acoustic pulse signals), and is transmitted to the reception unit 2 via a gas pipe 3.

In the reception unit 2, the received acoustic signal is demodulated and is converted into the digital reception data which value is the same as the transmission data d. The reception data is transmitted to a terminal network control device and a center station via a wire line (e.g. telephone line) or radio wave.

As acoustic signals, acoustic signals using a plurality of carrier waves (carriers) with different frequencies (S number of acoustic signals, where S is an integer of 2 or more) are used. If S number of acoustic signals are $X_1(t)$ to $X_S(t)$, then the i-th ($1 \leq i \leq S$: i is an integer) acoustic signal $X_i(t)$ is given by the following formula (1) in the present embodiment.

$$x_i(t) = \sum_{j=1}^{N} a_{ij} \cdot \sin(2\pi f_{ij}(t - t_{Pij}) + \phi_{ij}) \cdot \exp(-B^2(t - t_c)^2) \quad (1)$$

Here N is a positive integer and is the number of carrier wave signals (carrier signals) $u_{ij}(t) = \sin(2\pi f_{ij}(t - t_{Pij}))$ used for one acoustic signal $X_i(t)$. In the present embodiment, an arbitrary number of one or more carriers can be used for one acoustic signal $X_i(t)$. In other words, N may be 1 or an integer of 2 or more.

$f_{ij}$ is a frequency [Hz] of the carrier, $t_{Pij}$ is a phase offset time [sec.], and $\phi_{ij}$ is a phase modulation parameter. $\exp(-B^2(t-t_c)^2)$ is a modulation signal which indicates a Gaussian window function (or Gaussian window) (hereafter Gaussian window signal) as an example of a "window function", B is a band parameter [Hz] of the Gaussian window signal, and $t_c$ is a window center time [sec.] of the Gaussian window signal.

When a plurality of carriers are used for one acoustic signal $X_i(t)$, each carrier frequency $f_{ij}$ has a different value. In other words, if $j \neq k$, then $f_{ij} \neq f_{ik}$. For example, the relationship is $f_{i1} < f_{i2} < f_{i3} < \ldots < f_{iN}$, and an example is that a frequency with a 250 [Hz] interval (predetermined interval) starting with 2000 [Hz] may be assigned from $f_{i1}$ to $f_{iN}$, such as $f_{11}=2000$ [Hz], $f_{12}=2250$ [Hz], $f_{13}=2500$ [Hz] ..., or a frequency which interval between two adjacent frequencies is not constant may be allocated.

Frequencies used for one acoustic signal and frequencies used for the other acoustic signal have mutually different values. In other words, if $i \neq k$, then $f_{ij}$ is different from any of $f_{k1}$ to $f_{kN}$. For example, the first carrier frequencies of acoustic signals $x_1(t)$ to $x_S(t)$ are in the relationship of $f_{11} < f_{21} < f_{31} < \ldots < f_{S1}$ ($<f_{12}$), and the second carrier frequencies thereof are in the relationship of $f_{12} < f_{22} < f_{32} < \ldots < f_{S2}$ ($<f_{13}$). The third or later carrier frequencies are also in a similar relationship. The interval of two adjacent frequencies (e.g. difference between $f_{11}$ and $f_{21}$, the difference between $f_{21}$ and $f_{31}$, and the like) may be a predetermined value or may be a different value.

If the volume of information to be transmitted by one carrier signal $u_{ij}(t) = \sin(2\pi f_{ij}(t - t_{Pij}))$ included in one acoustic signal $x_i(t)$ is n [bits] (n is a positive integer), then n·N (n multiplied by N) [bits] of information is transmitted by one acoustic signal $x_i(t)$, since one acoustic signal $x_i(t)$ has N number of carrier signals combined (added). By setting N number of carrier signals to be transmitted in this way, transmission speed can be N times in comparison with the case when only one carrier signal is set.

For the transmission data d (bit serial data) to be input to the transmission unit 1, (n·N) bits from the first bit to the (n·N)th bit are transmitted by the first acoustic signal $x_1(t)$. The next (n·N) bits from the (n·N+1)th bit to the (2·n·N)th bit are transmitted by the second acoustic signal $x_2(t)$. In the same way, subsequent transmission data is divided into (n·N) bit units, and is sequentially transmitted by each acoustic signal of the third acoustic signal $x_3(t)$ to the S-th acoustic signal $x_S(t)$. Then returning to the first acoustic signal $x_1(t)$, the transmission data is transmitted again by the first acoustic signal $x_1(t)$ to the S-th acoustic signal $x_S(t)$ sequentially. In this way, the acoustic signals $x_1(t)$ to $x_S(t)$ are cyclically used.

Now examples of the acoustic signal $x_i(t)$ will be described.

(1) First Example of an Acoustic Signal

The acoustic signal $x_i(t)$ can be generated by performing multi-value phase shift keying (PSK) on the carrier signal $u_{ij}(t)$ based on the transmission data d. In this case, the amplitude parameter (amplitude value) $a_{ij}$ and the phase offset time $t_{Pij}$ of the acoustic signal $x_i(t)$ expressed by the above-mentioned formula (1) are set to predetermined values respectively ($a_{ij}=1$ [V], and $t_{Pij}=0$ [sec.] will be used below as an example). The value of the phase of each carrier signal $u_{ij}(t)$ is shifted by a phase modulation parameter $\phi_{ij}$ determined based on the transmission data d.

Figure 2B:
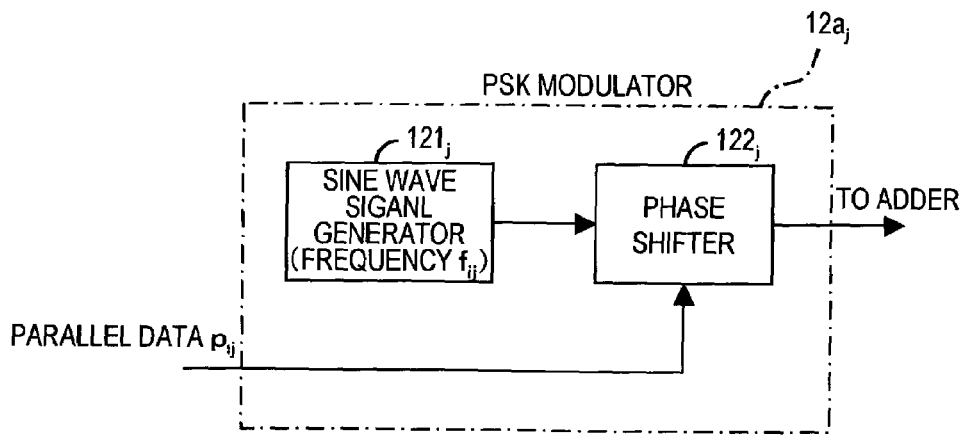
FIG. 2B is a block diagram depicting a detailed configuration of the PSK modulator included in the modulator.

FIG. 2A is a block diagram depicting a detailed configuration of the serial/parallel converter 11 and the modulator 12 when PSK is performed, and FIG. 2B is a block diagram depicting a detailed configuration of the PSK modulator $12a_j$ (j=1 to N) included in the modulator 12. The serial transmission data $d = \{d_1, d_2, \ldots\}$, which has been input to the transmission unit 1, is first input to the serial/parallel converter 11.

The serial/parallel converter 11 divides the transmission data d into n-bit units from the first bit so that the transmission data is separated into N number of parallel data $p_{11}$ to $p_{1N}$, each of which has n bits. For example, when n=3, the transmission data d is separated into parallel data $p_{11}=\{d_1, d_2, d_3\}$, $p_{12}=\{d_4, d_5, d_6\}, \ldots$, and $p_{1N}=\{d_{3N-2}, d_{3N-1}, d_{3N}\}$. In the same way, the subsequent transmission data is separated into N number of parallel bits in n-bit units, and parallel data $p_{21}$ to $p_{2N}$ are created. Hereafter, parallel data is sequentially created in the same manner. The parallel data created like this is generalized and represented by parallel data $p_{i1}$ to $p_{iN}$ (i is a positive integer). And the group of parallel data of the parallel data $p_{i1}$ to $p_{iN}$ is regarded as group $G_i$.

The serial/parallel converter 11 has N number of output terminals $O_1$ to $O_N$, which is the same as the number of carriers signals N, included in one acoustic signal. The serial/parallel converter 11 outputs the parallel data $p_{11}$ to $p_{1N}$ (group $G_1$) to the output terminals $O_1$ to $O_N$ respectively. Then the serial/parallel converter 11 sequentially outputs the parallel data $p_{21}$ to $p_{2N}$ (group $G_2$), $p_{31}$ to $p_{3N}$ (group $G_3$), ..., which are subsequent to the parallel data $p_{11}$ to $p_{1N}$ from the output terminals $O_1$ to $O_N$ respectively.

The parallel data $p_{11}$ to $p_{1N}$ are transmitted by the first acoustic signal $x_1(t)$. The subsequent parallel data $p_{21}$ to $p_{2N}$ are transmitted by the second acoustic signal $x_2(t)$. The other parallel data are also transmitted in the same way, in other words, the parallel data $p_{i1}$ to $p_{iN}$ are transmitted by the i-th acoustic signal $x_i(t)$.

The modulator 12 is comprised of N number of PSK modulators $12a_1$ to $12a_N$, an adder 12b, multiplier 12c, and Gaussian window signal generator 12d.

The N number of parallel data $p_{11}$ to $p_{1N}$ from the output terminals $O_1$ to $O_N$ are input to the N number of PSK modulators $12a_1$ to $12a_N$ respectively.

The PSK modulators $12a_j$ (j=1 to N, here and herein below), all have the same configuration, and have a sine wave signal generator $121_j$ for the sine wave carrier signal $u_{ij}(t)$, and a phase shifter $122_j$ for shifting the phase of the carrier signal $u_{ij}(t)$.

The sine wave signal generator $121_j$ sequentially generates sine wave signals (carrier signals) $u_{1j}(t) = \sin(2\pi f_{1j} t)$ to $u_{Sj}(t) = \sin(2\pi f_{Sj} t)$ with S number of frequencies $f_{1j}$ to $f_{Sj}$ cyclically synchronizing with the group $G_1$ to $G_S$ to be input. In other words, the sine wave signal generator $121_j$ generates the sine wave signal with frequency $f_{1j}$ for the group $G_1$, sine wave signal with frequency $f_{2j}$ for the group $G_2$, ..., and sine wave signal with frequency $f_{Sj}$ for the group $G_S$ respectively. Returning to the sine wave with frequency $f_{1j}$ again for the subsequent group $G_{S+1}$, the sine wave signal generator sequentially generates sine wave signals with frequencies $f_{1j}$ to $f_{Sj}$.

The carrier signal generated by the sine wave signal generator $121_j$ is input to the phase shifter $122_j$. The parallel data $p_{ij}$ is also input to the phase shifter $122_j$.

Figure 3:
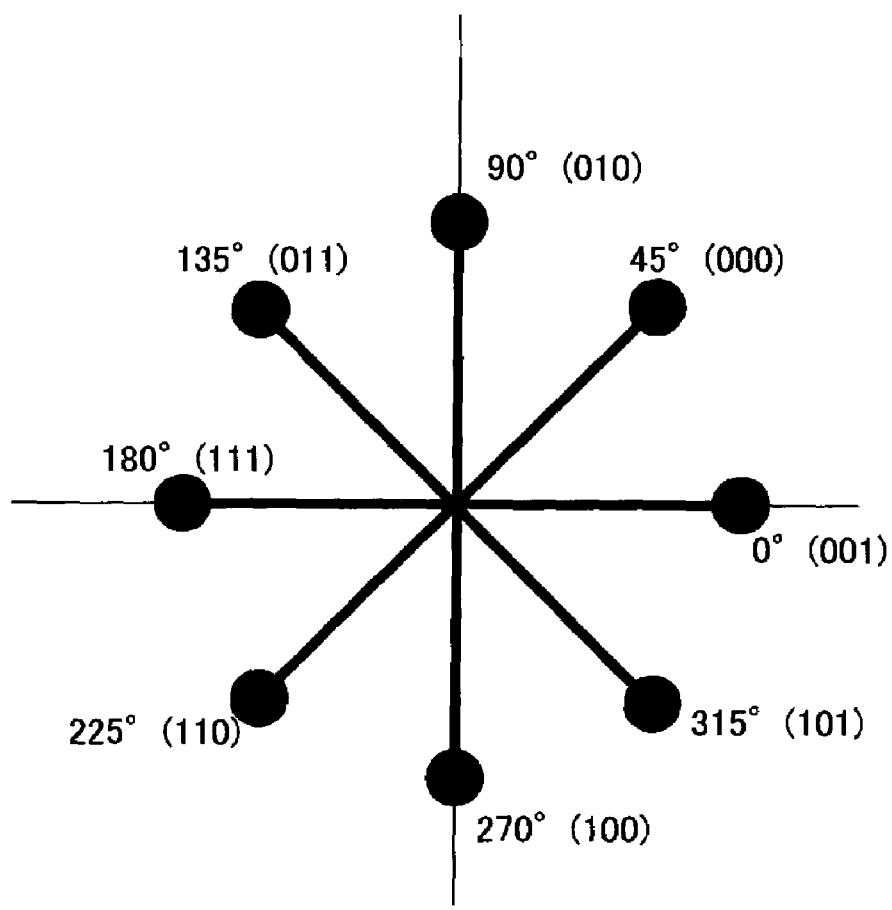
FIG. 3 shows relationship (constellation) between 3-bit parallel data and phase shift amount in an 8 phase PSK.

In the phase shifter $122_j$, phase shift amount $\phi_{ij}$ corresponding to the parallel data $p_{ij}$ has been set in advance. For the phase shift amount $\phi_{ij}$, an angle with a $2\pi \div 2^n$ interval created by $2^n$ phase PSK is assigned, for example. As an example, in the case of an 8 phase PSK where n=3, the phase shift amount shown in FIG. 3 is assigned to each one of the 3-bit parallel data. In FIG. 3, the phase shift amount and the 3-bit parallel data are corresponded (constellated) so that the inter-symbol distance of the adjacent phases becomes the minimum.

The phase shifter $122_j$ shifts the phase of the carrier signal $u_{ij}(t)$ for the amount of the phase shift $\phi_{ij}$ corresponding to the parallel data $p_{ij}$ which was input. By this, the carrier signal $u_{ij}(t)$ is converted into the modulated signal $v_{ij}(t)$ shown in the following formula (2).

$$v_{ij}(t)=\sin(2\pi f_{ij}t+\phi_{ij}) \quad (2)$$

In the formula (2), as described above, the phase offset time $t_{Pij}$ is 0, so the time $t_{Pij}$ is omitted.

The N number of modulated signals $v_{i1}(t)$ to $v_{iN}(t)$, which were output from each phase shifter $122_j$, are input to the adder 12b, and are added there. By this, the added signal $w_i(t)$ shown in the following formula (3) is generated.

$$w_i(t) = \sum_{j=1}^{N} \sin(2\pi f_{ij}t + \phi_{ij}) \quad (3)$$

This added signal $w_i(t)$ is multiplied, with multiplier 12c, by the Gaussian window signal $g(t)=\exp(-B^2(t-t_c)^2)$ which is input from the Gaussian window signal generator 12d.

Figure 4A:
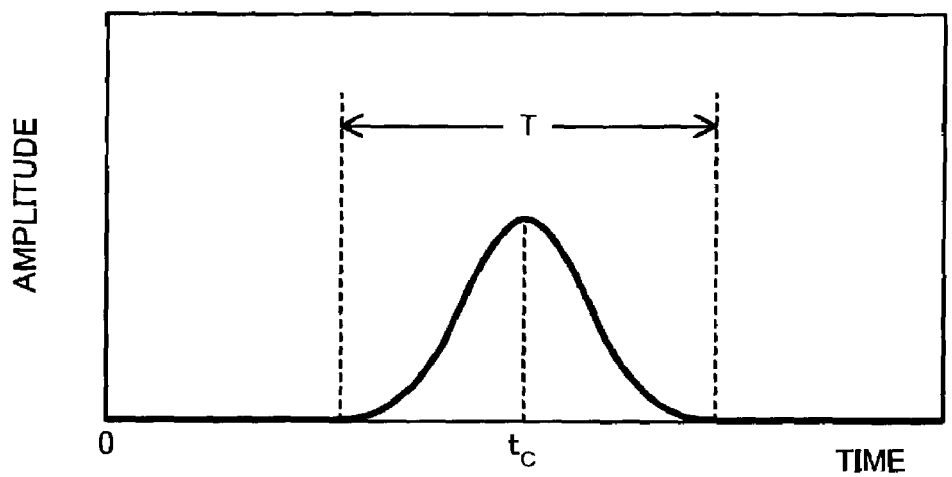
FIG. 4A is a graph depicting a time waveform of the Gaussian window signal g(t) generated by the Gaussian window signal generator.
Figure 4B:
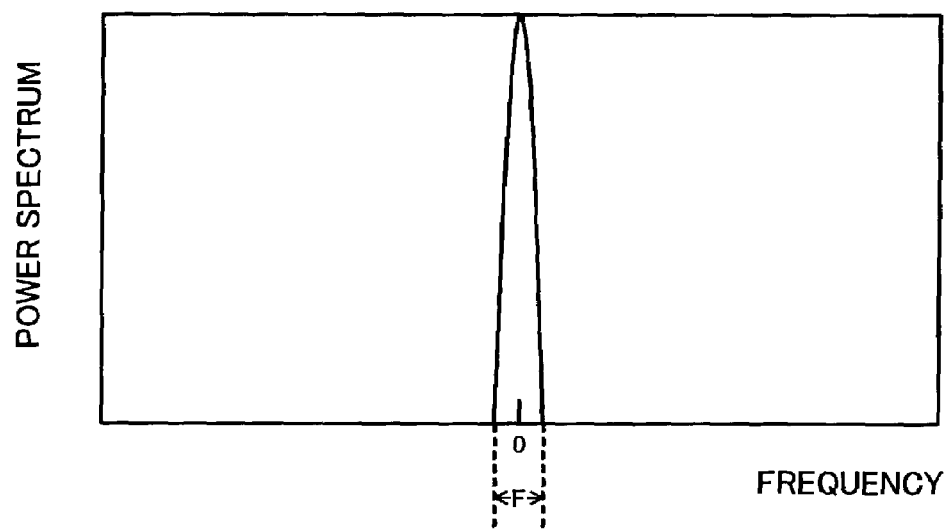
FIG. 4B shows a power spectrum (frequency spectrum) of the Gaussian window signal g(t)

FIG. 4A is a graph depicting a time waveform of the Gaussian window signal g(t) generated by the Gaussian window signal generator 12d, and FIG. 4B shows a power spectrum (frequency spectrum) thereof.

As FIGS. 4A and 4B show, the Gaussian window signal g(t) has such a nature that amplitude rapidly approaches 0 in a time domain other than a predetermined limited time domain T, and power also rapidly approaches 0 in a frequency domain other than a predetermined limited frequency domain F (most of the power is localized in the frequency domain F).

Therefore, for the signal where the modulated signal $v_{ij}(t)$ is multiplied by the Gaussian window signal g(t), that is $v_{ij}(t) \cdot g(t)$ as well, amplitude rapidly approaches 0 in a time domain other than a predetermined limited time domain, and power rapidly approaches 0 in a frequency domain other than a predetermined limited frequency domain F (most of the power is localized in the frequency domain F). FIG. 5A shows an example of the time waveform of 8 signals $v_{i1}(t)\cdot g(t)$ to $v_{i8}(t)\cdot g(t)$ when N=8, and FIG. 5B shows the power spectrum thereof. FIG. 5C shows the time waveform of 8 signals $v_{i1}(t)\cdot g(t)$ to $v_{i8}(t)\cdot g(t)$ added, and FIG. 5D shows the power spectrum of the 8 signals added. In this way, the signal $v_{ij}(t)\cdot g(t)$ has a predetermined range in the time domain and frequency domain, so even when a plurality of signals $v_{ij}(t)\cdot g(t)$ are added to create the added signal $w_i(t)\cdot g(t)$, interference between each signal $v_{ij}(t)\cdot g(t)$ can be decreased.

The Gaussian window signal is multiplied by the multiplier 12c, and as a result, an electric signal ($y_i(t)$) having the same waveform as the acoustic signal $x_i(t)$ is generated, as shown in the following formula (4), and is output from the multiplier 12c.

$$y_i(t) = \sum_{j=1}^{N} \sin(2\pi f_{ij}t + \phi_{ij}) \cdot \exp(-B^2(t-t_c)^2) \quad (4)$$

The processing sequence of the modulator 12 is an example, and it is also possible, for example, that the carrier signal $u_{ij}(t)$ is multiplied by the Gaussian window signal g(t) first, then the phase of the carrier signal $u_{ij}(t)$ included in the multiplied signal is shifted by the phase shifter $122_j$.

Such processing of the modulator 12 can be performed using digital data (digital signals) or using analog data (analog signals). If processing is performed using digital data, the D/A converter 13 is disposed in the subsequent stage of the modulator 12, as shown in FIG. 1, and the digital signals $y_i(t)$ are converted into analog signals and are then input to the amplifier 14. If the processing is performed using analog data, on the other hand, the D/A converter 13 shown in FIG. 1 is omitted, and the analog signals $y_i(t)$ are directly input to the amplifier 14.

The analog signals $y_i(t)$ input to the amplifier 14 are amplified, and are then input to the speaker 15. The speaker 15 converts the analog electric signals $y_i(t)$ from the amplifier 14 into the acoustic signals $x_i(t)$, and outputs (transmits) the acoustic signals $x_i(t)$ to the gas pipe 3 as sound.

In this way, the acoustic signals $x_1(t)$ to $x_S(t)$ modulated by the group $G_1$ to $G_S$ respectively, are sequentially transmitted. The acoustic signals $x_1(t)$ to $X_S(t)$ modulated by the subsequent group $G_{S+1}$ to $G_{2S}$ respectively, are also sequentially transmitted. This processing is repeated.

The transmission interval (Td) between an arbitrary two adjacent acoustic signal $x_i(t)$ and acoustic signal $x_{i+1}(t)$ will be described later. The transmission interval (Ts) between the i-th acoustic signal $x_i(t)$ and the (i+S)th acoustic signal, which is transmitted at S-th transmission after the transmission of the acoustic signal $x_i(t)$, (this acoustic signal is called $x_{i+S}(t)$), for which carrier signals having a same frequency are used, will also be described later.

The acoustic signals $x_i(t)$ transmitted through the gas pipe 3, are received by the microphone 26 of the reception unit 2, are converted into the electric signals $y_i(t)$, and are then input to the amplifier 25. The microphone 26 may include a preamplifier, and the electric signals $y_i(t)$ may be preamplified by this preamplifier, and then be input to the amplifier 25.

For the signal $y_i(t)$ amplified by the amplifier 25, only signals in a predetermined band are selected by the BPF 24, are then input to the A/D converter 23, and are converted into digital signals (digital data) by the A/D converter 23. This digital data is input to the FFT 22, and is Fourier-transformed.

In the FFT 22, based on the digital data after Fourier transformation, N number of phase values corresponding to the frequency $f_{ij}$ (that is, the frequency of the carrier) of the sine wave signal generator $121_j$ of the transmission unit 1 are read. The read phase value corresponds to the phase shift amount by the phase shifter $122_j$.

In the demodulation processor 27, n bits of digital data corresponding to the read phase value has been set in advance, just like the phase shifter $122_j$. By this, N number of n bit digital data corresponding to the read phase value are determined in the demodulation processor 27, and the determined N number of digital data are input to the parallel/serial converter 21.

In this way, the phase value is obtained by the FFT 22, and this phase value is converted into bit information by the demodulation processor 27, based on the same setting as the phase shifter $122_j$ of the transmission unit 2, so that the reception unit 2, which does not require a complicated circuit configuration, can be constructed.

The parallel/serial converter 21 converts the N number of n bit digital data into serial digital data and outputs the serial digital data. The digital data which is output from the parallel/serial converter 21 is transmitted to the terminal network control device or a center station via a wire line (e.g. telephone line) or a radio wave.

Such processing of the reception unit 2 is repeatedly executed for each acoustic signal to be received.

The reception unit 2 can judge the presence of an acoustic signal based on the amplitude value (level) of the signal to be received by the microphone 26. In other words, when the amplitude value of the received signal becomes a predetermined threshold or more, the reception unit 2 judges that the acoustic signals have been received, and captures the acoustic signals in the time domain Tr, which is the time between the t1 second before and the t2 second after the time when the received signal exceeded the threshold, regarding this time as the time domain Tr where the acoustic signals exist, and demodulates the acoustic signals. The threshold is set to a value whereby the acoustic signal and the reverberation can be identified. The specific value thereof is determined based on experiment, simulation and actual operation. The time domain Tr where the acoustic signals exist is the time width of the pulse signal which the transmission unit 1 transmits, which can be known in advance. (Also t1 and t2 can be known in advance.) Since the reception unit 2 can judge the presence of the acoustic signal by the amplitude value of the received signals, the configuration of the reception unit 2 can be simplified.

Now the transmission interval of acoustic signals will be described.

Figure 6:
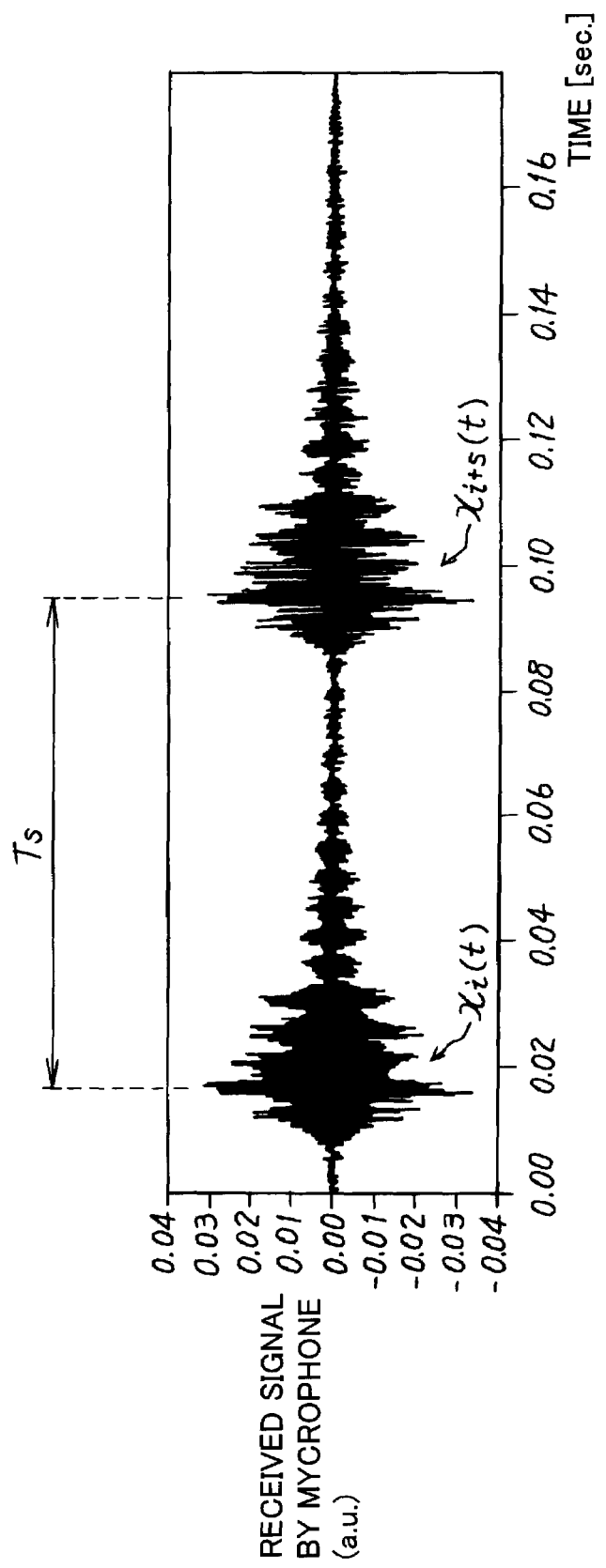
FIG. 6 shows the received waveform, by the microphone, of the two acoustic signals $x_i(t)$ and $x_{i+S}(t)$ for which the same carrier signals are used.

FIG. 6 shows the received waveform, by the microphone 26, of the two acoustic signals $x_i(t)$ and $x_{i+S}(t)$ for which carrier signals $u_{i1}(t)$ to $u_{iN}(t)$ with the same frequency are used. This received waveform includes the waveforms of the acoustic signal and the reverberation signal (delay signal) thereof.

Since both of the acoustic signals have the same frequency, the transmission interval Ts of the acoustic signals is set to an interval whereby the reverberation wave (delay wave) of the acoustic signal $x_i(t)$, which was previously transmitted, sufficiently attenuates, and the phase value corresponding to the frequency of each carrier of the next acoustic signal $x_{i+S}(t)$ can be read even if the reverberation wave interferes with the acoustic signal $x_{i+S}(t)$ (e.g. 80 msec.). This transmission interval Ts, however, also depends on the sensitivity of the microphone 26, the accuracy of the amplifier 25 or the demodulator 27 of the reception unit 2, and the error rate, which is allowed for the reception unit 2, so a specific value of the transmission interval Ts is determined based on experiment, simulation and actual operation.

Two arbitrary adjacent acoustic signals, $x_i(t)$ and $x_{i+1}(t)$, on the other hand, use carriers with different frequencies. Therefore even at a position where the reverberation wave of the previous acoustic signal $x_i(t)$ somewhat remains, that is, at a position between the acoustic signal $x_i(t)$ and $x_{i+S}(t)$ (during the transmission interval Ts), the next acoustic signal $x_{i+1}(t)$ can be transmitted at this position. The subsequent acoustic signals $x_{i+2}(t)$ to $x_{i+S-1}(t)$, as well, can be transmitted during the transmission interval Ts.

Figure 7:
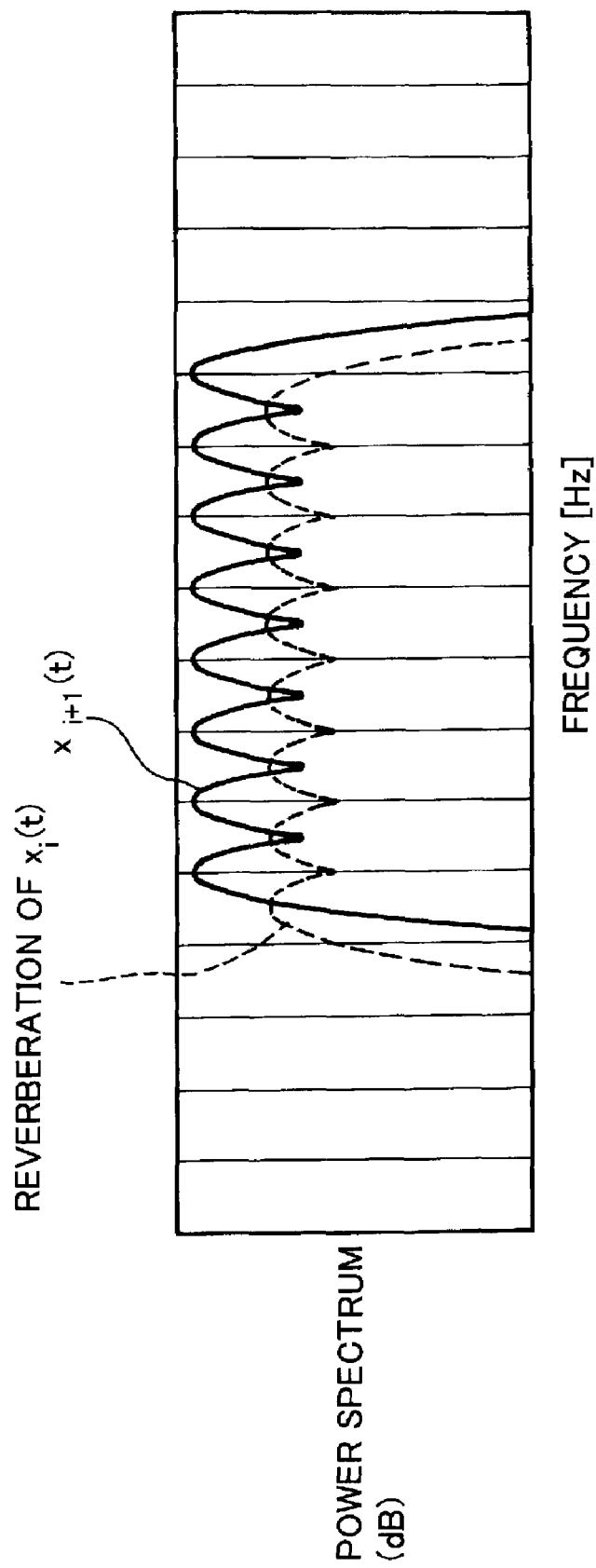
FIG. 7 is a graph depicting the relationship between the spectrum intensity (ordinate) and the frequency (abscissa)

The transmission interval Td of the two adjacent acoustic signals, however, is set to a value whereby the spectrum of the next adjacent acoustic signal $x_{i+1}(t)$ can be distinguished from the reverberation wave of the acoustic signal $x_i(t)$. FIG. 7 is a graph depicting the relationship between the spectrum intensity (ordinate) and the frequency (abscissa), where the spectrum intensity of the reverberation wave of the acoustic signal $x_i(t)$ is indicated by a broken line, and the spectrum intensity of the acoustic signal $x_{i+1}(t)$ is indicated by a solid line. Since the frequency is different between the reverberation wave of the acoustic signal $x_i(t)$ and the acoustic signal $x_{i+1}(t)$, the value of the frequency at which the spectrum intensity peaks is different between these two acoustic signals. The transmission interval Td is set to the time whereby the peak of the spectrum intensity of the acoustic signal $x_{i+1}(t)$ can be distinguished from the spectrum intensity of the reverberation wave of the acoustic signal $x_i(t)$ at the frequency with this peak value. The specific value of the transmission interval Td, however, also depends on the sensitivity of the microphone 26 of the reception unit 2, the accuracy of the amplifier 25 and the demodulation processor 27, and the error rate which is allowed for the reception unit 2, so the specific value is determined based on experiment, simulation, and actual operation considering these factors.

As long as the transmission interval allows for such a distinction from the spectrum intensity of the reverberation wave, each transmission interval between the two adjacent signals of the acoustic signals $x_1(t)$ to $x_S(t)$ may be a constant interval, or may be different from each other. If the transmission interval is constant, then the relationship of Td and Ts becomes Td=Ts÷S. The transmission unit 1 sequentially transmits each acoustic signal using such time intervals as Ts and Td.

By this, transmission data can be transmitted without being subject to the influence of the reverberation wave in the gas pipe 3 (particularly in the bending section and branching section of the gas pipe 3). In particular, the transmission interval can be decreased by transmitting an acoustic signal with a different frequency from the reverberation wave, even in an area where the reverberation wave is relatively high, so transmission speed can be improved. In other words, by using S number of acoustic signals, a transmission speed of S times the prior art can be achieved. Also a plurality of bits of information can be transmitted by one acoustic signal, so transmission speed can be further improved.

N can be N=1, and in this case the serial/parallel converter 11 and the adder 12b are unnecessary in the transmission unit 1, and the parallel/serial converter 21 is unnecessary in the reception unit 2. The Gaussian window signal is just an example of a signal which represents a window function, and another window function can be used. The above mentioned processing by FFT 22 may be performed by DFT (discrete Fourier transformer).

(2) Second Example of an Acoustic Signal

The transmission data d can be transmitted by executing QAM (Quadrature Amplitude Modulation), for applying both phase modulation (particularly PSK) and amplitude modulation (particularly amplitude shift keying (ASK)) to the carrier signals.

The overall configuration of the acoustic communication device is the same as the one in FIG. 1. Whereas the modulator 12 has a configuration which is different from the one shown in FIG. 2, in order to execute QAM. FIG. 8A is a block diagram depicting a detailed configuration of the serial/parallel converter and modulator 12 in the case of when QAM is executed, and FIG. 8B is a block diagram depicting a detailed configuration of the QAM modulator $12g_j$ (j=1 to N) included in the modulator 12. Components the same as FIG. 2 are denoted with the same reference numerals, for which detailed descriptions are omitted.

The serial/parallel converter 11 performs processing the same as the above-mentioned first example, and outputs the separated parallel data $p_{i1}$ to $p_{iN}$ to the output terminals $O_1$ to $O_N$ respectively.

The modulator 12 has N number of QAM modulators $12g_1$ to $12g_N$, adder 12b, multiplier 12c, and Gaussian window signal generator 12d. N number of parallel data $p_{i1}$, to $p_{iN}$, which are output from the serial/parallel converter 11, are input to N number of QAM modulators $12g_1$ to $12g_N$ respectively.

The QAM modulators $12g_j$ (j=1 to N, here and herein below) all have the same configuration, and have a sine wave signal generator $121_j$ for generating the sine wave carrier signal $u_{ij}(t)$, phase shifter $122_j$ for shifting the phase of the carrier signal $u_{ij}(t)$, phase shift amount/amplitude value setting unit $123_j$, and multiplier $124_j$.

The parallel data $p_{ij}$ is input to the phase shift amount/amplitude value setting unit $123_j$. In the phase shift amount/amplitude value setting unit $123_j$, the phase shift amount for shifting the phase of the carrier signal $u_{ij}(t)$ and the amplitude amount for changing the amplitude of the carrier signal $u_{ij}(t)$ according to the value of the input parallel data $p_{ij}$ have been set in advance. By this, the phase shift amount/amplitude value setting unit $123_j$ outputs the phase shift amount, corresponding to the value of the parallel data $p_{ij}$, to the phase shifter $122_j$, and the amplitude value to the multiplier $124_j$ respectively.

The phase shifter $122_j$ shifts the phase of the carrier signal $u_{ij}(t)$ for the shift amount which is input from the phase shift amount/amplitude value setting unit $123_j$, and inputs the carrier signal $u_{ij}(t)$ after the phase is shifted to the multiplier $124_j$.

The multiplier $124_j$ multiplies the carrier signal from the phase shifter $122_j$ by the amplitude value which from the phase shift amount/amplitude value setting unit $123_j$, and outputs the result to the adder $12b$. The adder $12b$ and multiplier $12c$ perform processing the same as the above-mentioned first example.

In this way, the transmission unit 1 applies QAM to the carrier signal based on the transmission data d, and transmits the modulated signal as an acoustic signal.

In the reception unit 2, on the other hand, FFT (or DFT) 22 (see FIG. 1) reads the phase value and the amplitude value at the frequency $f_{ij}$ of the sine wave signal generator $121_j$ (that is, the frequency of the carrier) of the transmission unit 1. And n-bit parallel data, corresponding to the read phase value and the amplitude value, is determined. The determined N number of parallel data is converted into serial digital data by the parallel/serial converter 21 (see FIG. 1), and is output.

By using such QAM as well, an effect, similar to the above-mentioned first example, can be obtained.

Figure 9:
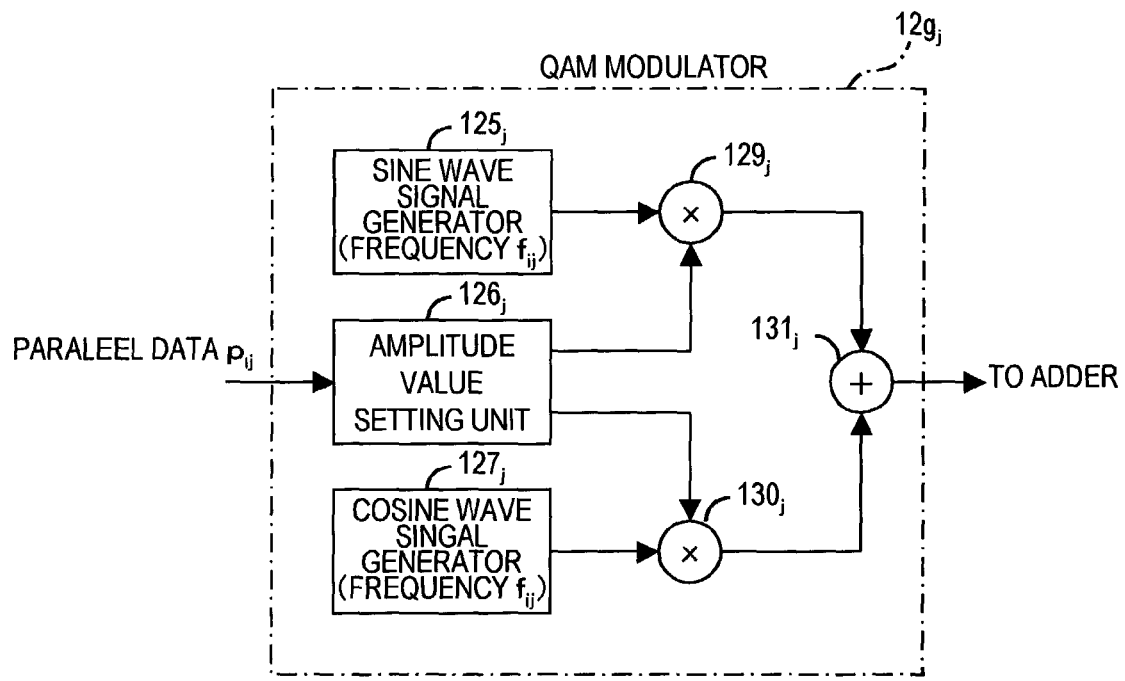
FIG. 9 is a block diagram depicting another configuration of the QAM modulator.

The QAM modulator $12g_j$ may have the configuration shown in FIG. 9. In this QAM modulator $12g_j$, a first carrier signal $u1_{ij}(t)=-\sin 2\pi f_{ij}(t-t_{Pij})$ is output from a sine wave signal generator $125_j$, and a second carrier signal $u2_{ij}(t)=\cos 2\pi f_{ij}(t-t_{Pij})$ is output from a cosine wave signal generator $127_j$.

In a amplitude value setting unit $126_j$, an amplitude value $b_{ij}$ of the first carrier signal $u1_{ij}(t)$ and an amplitude value $c_{ij}$ of the second carrier signal $u2_{ij}(t)$, corresponding to the value of the parallel data $p_{ij}$ to be input, have been set in advance. The amplitude setting unit $126_j$ outputs the amplitude values $b_{ij}$ and $c_{ij}$ corresponding to the value of the parallel data $p_{ij}$ to be input to the multipliers $129_j$ and $130_j$ respectively.

The multipliers $129_j$ and $130_j$ multiply the first carrier signal $u1_{ij}(t)$ and the second carrier signal $u2_{ij}(t)$ by the amplitude values $b_{ij}$ and $c_{ij}$ respectively, and output the multiplication results to the adder $131_j$. The adder $131_j$ adds the inputs signals, and sends the addition result to the adder $12b$.

By such processing, the acoustic signal $x_1(t)$ becomes a signal expressed by the following formula (5).

$$x_i(t) = \sum_{j=1}^{N} \{c_{ij}\cos 2\pi f_{ij}(t-t_{Pij}) - b_{ij}\sin 2\pi f_i(t-t_{Pij})\} \cdot \exp(-B^2(t-t_c)^2) \quad (5)$$

The above described processing of the QAM modulator $12g_j$ may be performed using digital signals (digital data) or using analog signals (analog data), just like the case of the PSK modulator $12a_j$ in the first example. Also just like the first example, N may be N=1, and in this case, the serial/parallel converter 11 and the adder $12b$ are unnecessary in the transmission unit 1, and the parallel/serial converter 21 is unnecessary in the reception unit 2. Also another window function may be used.

Figure 10:
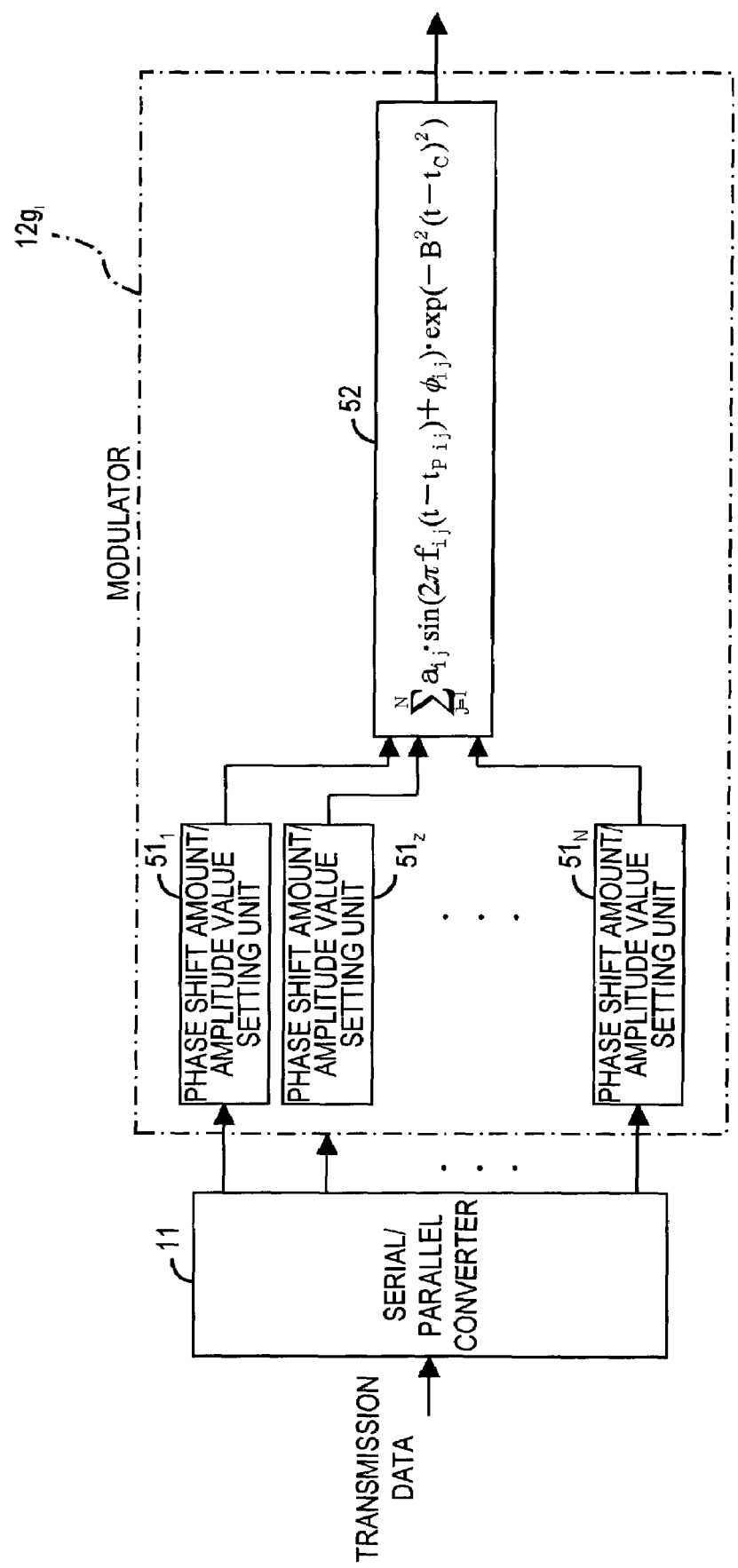
FIG. 10 is a block diagram depicting another configuration of the QAM modulator.

When the processing of the QAM modulator $12g_j$ is performed using digital data, particularly by a computer, the QAM modulator $12g_j$ can be configured as shown in FIG. 10. In other words, phase shift amount/amplitude value setting units $51_1$ to $51_N$ determine phase shift amounts and amplitude values corresponding to the parallel data $p_{i1}$ to $p_{iN}$ respectively, and output the result to a computing unit 52. The computing unit 52 substitutes the provided phase shift amounts and the amplitude values for the formula (1), computes it, and outputs the computation result.

The phase shift amount/amplitude value setting units $51_1$ to $51_N$ may be replaced with a setting unit for setting the amplitude value $b_{ij}$ of the first carrier signal $u1_{ij}(t)$ and the amplitude value $c_{ij}$ of the second carrier signal $u2_{ij}(t)$, and the computing unit 52 may be replaced with a computing unit which computes the formula (5).

The same configuration can be used when the PSK described in the first example is used.

(3) Another Example of an Acoustic Signal

In the above mentioned first and second example, the number of carrier waves to be used for each one of the first acoustic signal $x_i(t)$ to the S-th acoustic signal $x_S(t)$ is a same number N, but a different number of carrier waves may be used for each acoustic signal.

Modulation may be performed only by amplitude shift keying (ASK) to create acoustic signals.

(4) Other Embodiments

The transmission unit 1 may be disposed in a terminal network control device or center station, for example, and the reception unit 2 may be disposed in a gas meter, so that an instruction to close the gas cock, transmitted from the center station, is input to the gas meter, and the gas meter executes the operation to close the gas cock.

The above-mentioned generation of a transmission signal by the modulation processing of the transmission unit 1 may be performed by inverse Fourier transform.

Processing performed by a computer can be written as a program, and this program can be recorded in a recording medium, such as a flexible disk, memory card, CD-ROM or the like, and be made available.

According to the present invention, the transmission speed of acoustic communication can be improved. And an acoustic communication device and an acoustic signal communication method resistant to reverberation can be provided.

What is claimed is:

1. An acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said acoustic transmitter comprising:
- a modulation unit, which performs amplitude modulation and/or phase modulation based on transmission information, and modulation by a signal indicating a window function, for the carrier wave of each of said plurality of pulse signals; and
- an acoustic transmission unit, which sequentially transmits said plurality of pulse signals modulated by said modulation unit by sound.

2. The acoustic transmitter according to claim 1, wherein when at least one of said plurality of pulse signals is a signal of a plurality of modulated carrier waves, said plurality of carrier waves have mutually different frequencies, and said modulation unit performs said modulation for said plurality of carrier waves based on individual pieces of transmission information respectively.

3. The acoustic transmitter according to claim 2, wherein said modulation unit further comprises a dividing unit, which creates said individual pieces of transmission information by dividing a piece of transmission information into the same number of partial pieces of information as the number of said carrier waves.

4. The acoustic transmitter according to claim 1, wherein said signal indicating said window function is a Gaussian window signal.

5. The acoustic transmitter according to claim 1, wherein:
- the modulation based on said transmission information by said modulation unit is phase shift keying, amplitude shift keying, or QAM; and
- said modulation unit converts said transmission information into a phase shift amount of said carrier wave in the case of said phase shift keying, converts said transmission information into an amplitude value of said carrier wave in the case of said amplitude shift keying, or converts said transmission information into an amplitude value and phase shift amount of said carrier wave in the case of QAM.

6. An acoustic signal transmission method for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said method comprising:
- performing amplitude modulation and/or phase modulation based on transmission information, and modulation by a signal indicating a window function, for the carrier wave of each of said plurality of pulse signals; and
- sequentially transmitting said modulated plurality of pulse signals by sound.

7. A program product for a computer installed in an acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said program product comprising:
- performing amplitude modulation and/or phase modulation based on digital data indicating transmission information for digital data representing the carrier wave of each of said plurality of pulse signals; and
- performing modulation by a signal indicating a window function for said digital data representing the carrier wave.

8. A program product for a computer installed in an acoustic transmitter for sequentially transmitting a plurality of pulse signals by sound, each of said plurality of pulse signals being a signal of at least one modulated carrier wave, which has a predetermined frequency, the carrier wave of each of said plurality of pulse signals having a mutually different frequency, said program product comprising:
- when the carrier wave is modulated using phase shift keying based on transmission information, converting said transmission information into a phase shift amount of said carrier wave, when the carrier wave is modulated using amplitude shift keying based on said transmission information, converting said transmission information into an amplitude value of said carrier wave, or when the carrier wave is modulated using QAM based on said transmission information, converting said transmission information into an amplitude value and phase shift amount of said carrier wave; and
- substituting said amount and/or value converted from said transmission information for one or more parameters of a formula that multiplies a formula expressing said at least one carrier wave by a formula expressing a window function, said one or more parameters being the phase shift amount of the carrier wave in the case of the phase shift keying, the amplitude value of the carrier wave in the case of the amplitude shift keying, or the amplitude value and the phase shift amount of the carrier wave in the case of QAM.

9. An acoustic receiver for receiving a plurality of pulse signals by sound, each of said plurality of pulse signals being a signal of at least one modulated carrier wave, which has a predetermined frequency, the carrier wave of each of said plurality of pulse signals having a mutually different frequency, said acoustic receiver comprising:
- an acoustic reception unit, which sequentially receives, as sound, said plurality of pulse signals after amplitude modulation and/or phase modulation based on transmission information, and modulation by a signal indicating a window function are performed for the carrier wave of each of said plurality of pulse signals, and converts the pulse signals into electric signals; and
- a demodulation unit, which performs Fourier transform for each of said plurality of pulse signals converted by said acoustic reception unit, reads a phase value and/or amplitude value at the frequency of the carrier wave of each pulse signal, and demodulates communication information based on the read value.

10. An acoustic reception method for receiving a plurality of pulse signals by sound, each of said plurality of pulse signals being a signal of at least one modulated carrier wave, which has a predetermined frequency, the carrier wave of each of said plurality of pulse signals having a mutually different frequency, said method comprising:
- sequentially receiving, as sound, said plurality of pulse signals after amplitude modulation and/or phase modulation based on transmission information, and modulation by a signal indicating a window function are performed for the carrier wave of each of said plurality of pulse signals, and converting the received pulse signals into electric signals; and
- performing Fourier transform for each of said converted plurality of pulse signals, reading a phase value and/or amplitude value at the frequency of said carrier wave of each pulse signal, and demodulating communication information based on the read value.

11. An acoustic communication device, which has an acoustic transmitter for sequentially transmitting a plurality of pulse signals by sound and an acoustic receiver for sequentially receiving said plurality of pulse signals by sound, each of said plurality of pulse signals being a signal of at least one modulated carrier waves, which has a predetermined frequency, the carrier wave of each of said plurality of pulse signals having a mutually different frequency, wherein said acoustic transmitter comprises:
a modulation unit, which performs amplitude modulation and/or phase modulation based on transmission information, and modulation by a signal indicating a window function for the carrier wave of each of said plurality of pulse signals; and
an acoustic transmission unit, which sequentially transmits the plurality of pulse signals modulated by said modulation unit by sound; and said acoustic receiver comprises:
an acoustic reception unit, which sequentially receives the plurality of pulse signals transmitted by said acoustic transmission unit, and converts the pulse signals into electric signals; and
a demodulation unit, which performs Fourier transform for each of said plurality of pulse signals converted by said acoustic reception unit, reads a phase value and/or amplitude value at the frequency of the carrier wave of each pulse signal, and demodulates communication information based on the read value.

12. An acoustic signal communication method performed by an acoustic communication device, which has an acoustic transmitter for sequentially transmitting a plurality of pulse signals by sound and an acoustic receiver for sequentially receiving said plurality of pulse signals by sound, each of said plurality of pulse signals being a signal of at least one modulated carrier waves, which has a predetermined frequency, the carrier wave of each of said plurality of pulse signals having a mutually different frequency, said method comprising:

performing amplitude modulation and/or phase modulation based on transmission information, and modulation by a signal indicating a window function for the carrier wave of each of said plurality of pulse signals, in said acoustic transmitter;

sequentially transmitting said plurality of pulse signals by sound, in said acoustic transmitter; and sequentially receiving said plurality of pulse signals transmitted by said acoustic transmitter, and converting the received pulse signals into electric signals, in said acoustic receiver; and performing Fourier transform for each of said plurality of converted pulse signals, reading a phase value and/or amplitude value at the frequency of the carrier wave of each pulse signal, and demodulating communication information based on the read value, in said acoustic receiver.

* * * * *

UNITED STATES PATENT AND TRADEMARK OFFICE
CERTIFICATE OF CORRECTION

PATENT NO. : 7,027,357 B2
APPLICATION NO. : 10/310823
DATED : April 11, 2006
INVENTOR(S) : Hirohisa Sakuma et al.

It is certified that error appears in the above-identified patent and that said Letters Patent is hereby corrected as shown below:

On the Title page, item (56) References Cited, Other Publications column 2, line 4, after "vision in Practice, Sep. 23-25, 1997, pp. 93-98." Insert --Sakuma et al., "Research on Acoustic Communication Technology Study on Multi-carrier Modulation Method", Tokyo Gas Annual Technical Report Vol. 45, 2000 (with full English language translation).--

Signed and Sealed this

Twelfth Day of September, 2006

JON W. DUDAS
*Director of the United States Patent and Trademark Office*